(12) United States Patent
Baldwin

(10) Patent No.: US 9,711,137 B2
(45) Date of Patent: Jul. 18, 2017

(54) NETWORK-BASED BACKGROUND EXPERT

(75) Inventor: Christopher Baldwin, Crystal Lake, IL (US)

(73) Assignee: AT&T INTELLECTUAL PROPERTY I, LP, Atlanta, GA (US)

(*) Notice: Subject to any disclaimer, the term of this patent is extended or adjusted under 35 U.S.C. 154(b) by 246 days.

(21) Appl. No.: 13/293,417

(22) Filed: Nov. 10, 2011

(65) Prior Publication Data
US 2013/0124189 A1 May 16, 2013

(51) Int. Cl.
G10L 15/00 (2013.01)
G10L 15/04 (2013.01)
G10L 21/00 (2013.01)
G10L 25/00 (2013.01)
G10L 15/18 (2013.01)
G06F 17/27 (2006.01)

(52) U.S. Cl.
CPC .......... G10L 15/1815 (2013.01); G06F 17/27 (2013.01)

(58) Field of Classification Search
CPC .. G06F 11/3438; G06F 2201/875; G06F 3/14; G06F 17/27; H04L 67/04; G10L 15/1815
See application file for complete search history.

(56) References Cited

U.S. PATENT DOCUMENTS

| 6,427,137 B2 * | 7/2002 | Petrushin ...................... 704/273 |
| 7,151,772 B1 * | 12/2006 | Kalmanek et al. ........... 370/390 |
| 7,225,122 B2 * | 5/2007 | Shaw .................................. 704/9 |
| 7,298,256 B2 * | 11/2007 | Sato et al. ............... 340/539.11 |
| 7,606,701 B2 * | 10/2009 | Degani et al. ................. 704/207 |
| 7,676,025 B2 * | 3/2010 | Lautenschlager et al. ..... 379/35 |
| 7,818,179 B2 * | 10/2010 | Krasikov et al. ............ 704/274 |
| 7,979,279 B1 * | 7/2011 | McKinney .................... 704/251 |
| 8,050,921 B2 * | 11/2011 | Mark et al. .................... 704/246 |
| 2003/0154072 A1 * | 8/2003 | Young et al. ...................... 704/9 |
| 2004/0113908 A1 | 6/2004 | Galanes et al. ............... 345/418 |
| 2004/0162724 A1 * | 8/2004 | Hill et al. ...................... 704/231 |
| 2006/0285650 A1 * | 12/2006 | Hodge ........................ 379/32.01 |
| 2007/0041361 A1 * | 2/2007 | Iso-Sipila ..................... 370/352 |
| 2007/0071206 A1 * | 3/2007 | Gainsboro et al. ........... 379/168 |

(Continued)

OTHER PUBLICATIONS

Jan Gabrielsson et al., "Cloud Computing in Telecommunications", Ericsson Review • 1 2010, pp. 29-33.

(Continued)

Primary Examiner — Michael Ortiz Sanchez
(74) Attorney, Agent, or Firm — Amin, Turocy & Watson, LLP

(57) ABSTRACT

A system and methodology that provides a network-based, e.g., cloud-based, background expert for predicting and/or accomplishing a user's goals is disclosed herein. Moreover, the system monitors, in the background, user generated data and/or publicly available data to determine and/or infer a user's goal, with or without an active indication/request from the user. Typically, the user-generated data can include user conversations, such as, but not limited to, speech data in a voice call, text messages, chat dialogs, etc. Further, the system identifies an action or task that facilitates accomplishment of the user goal in real-time. Moreover, the system can automatically perform the action/task and/or request user authorization prior to performing the action/task.

20 Claims, 11 Drawing Sheets

(56) References Cited

U.S. PATENT DOCUMENTS

| | | | |
|---|---|---|---|
| 2007/0111713 A1* | 5/2007 | Silverbrook | H04M 1/21 455/414.1 |
| 2007/0162296 A1* | 7/2007 | Altberg | H04M 15/00 705/1.1 |
| 2008/0089488 A1* | 4/2008 | Brunson et al. | 379/88.12 |
| 2008/0240379 A1* | 10/2008 | Maislos et al. | 379/88.13 |
| 2008/0275701 A1* | 11/2008 | Wu et al. | 704/235 |
| 2009/0210228 A1* | 8/2009 | George | H04M 3/4936 704/251 |
| 2010/0009719 A1* | 1/2010 | Oh et al. | 455/563 |
| 2010/0106498 A1* | 4/2010 | Morrison | 704/235 |
| 2010/0169480 A1* | 7/2010 | Pamidiparthi | 709/224 |
| 2010/0205103 A1* | 8/2010 | Patrick et al. | 705/304 |
| 2011/0044438 A1* | 2/2011 | Wang et al. | 379/93.02 |
| 2011/0047221 A1* | 2/2011 | Watanabe et al. | 709/206 |
| 2012/0166179 A1* | 6/2012 | Tirumalachetty et al. | 704/9 |
| 2012/0224678 A1* | 9/2012 | Walters et al. | 379/189 |
| 2012/0317046 A1* | 12/2012 | Myslinski | 705/329 |

OTHER PUBLICATIONS

Dijiang Huang et al., "Secure Data Processing Framework for Mobile Cloud Computing", IEEE INFOCOM 2011 Workshop on Cloud Computing, pp. 620-624.

Verizon Wireless Solutions Brief, "Do More in the Cloud: Simplify the Delivery of Business Applications", 2011, verizonbusiness.com/socialmedia.

Nteligence Corp., "Home Page", 2011, http://www.agentos.net, Last accessed Mar. 2, 2012.

Ed Gubbins, "Verizon debuts cloud computing service" Jun. 3, 2009, http://connectedplanetonline.com/business_services/news/verizon-cloud-computing-0603 Last accessed Mar. 2, 2012.

Ed Gubbins, "How telcos could conquer the cloud", Apr. 1, 2009, http://connectedplanetonline.com/business_services/news/cloud-computing-telecom-service-providers-0401 Last Accessed Mar. 2, 2012.

\* cited by examiner

NETWORK-BASED BACKGROUND EXPERT

TECHNICAL FIELD

The subject disclosure relates to wireless communications and, more particularly, to a network-based, e.g., cloud-based, background expert.

BACKGROUND

Communications systems, networks, and devices have seen an explosive growth in past few years and, in future, are expected to see continuing growth with respect to applications, services, and/or functionality provided to a user. Conventional communication devices provide users with desired information, for example, search results, based on an explicit request (e.g., search parameters) submitted by the user. Moreover, conventional communication devices enable a user to actively seek out the desired information, process the information, manually identify a best course of action, based on their understanding and the variables that they have considered, make a decision, and finally, act based on that decision. Should a problem arise, all or part of this process has to be repeated by the user.

In particular, some conventional devices utilize a personal assistant software, such as, a voice-activated application that acts like a personal assistant to help a user perform a task. To utilize this application, the user has to actively open or turn on the application and explicitly submit a query. For example, the user can type or speak to request information, and, in response, the application can carry out a command and/or find solutions/answers to a question. Moreover, the application can use natural language processing to answer questions, make recommendations, and perform actions by delegating requests to an expanding set of web services.

DETAILED DESCRIPTION

Figure 1:
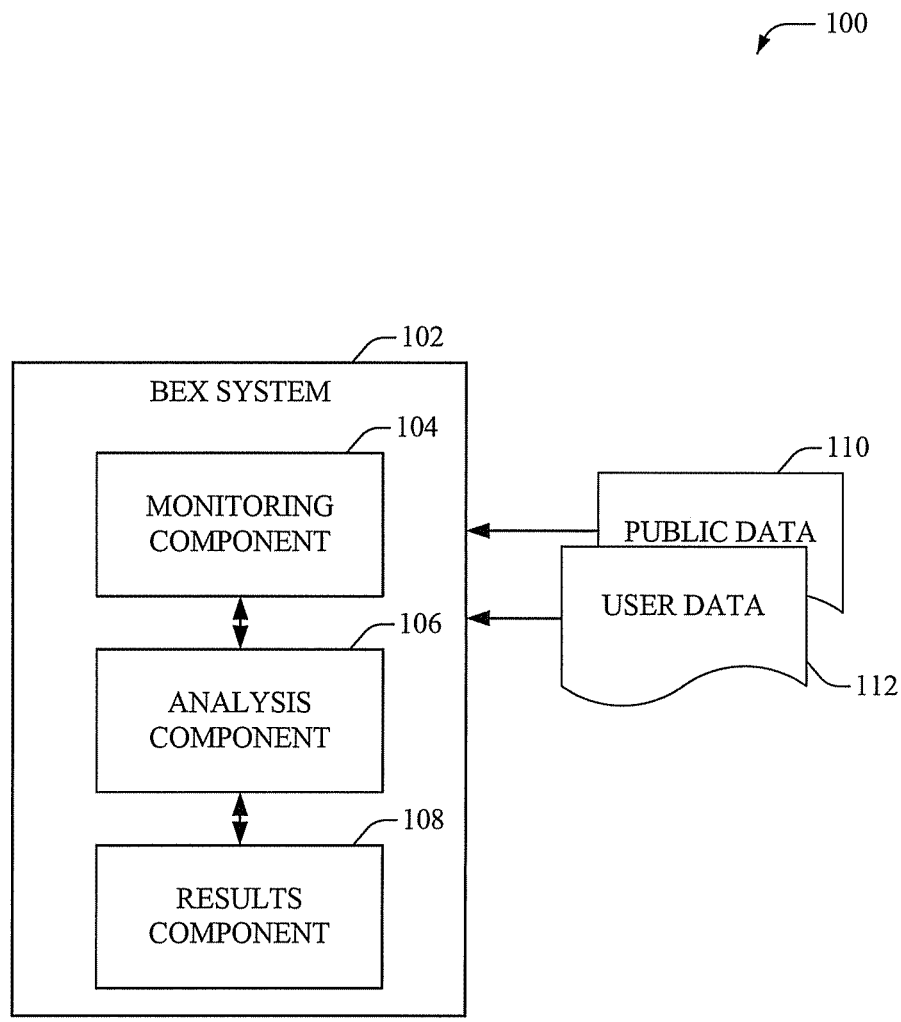
FIG. 1 illustrates an example system that includes a background expert (BEX) for inferring a user's goals and providing results and/or recommendations based on the inferred data.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "service," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Likewise, the terms "access point," "base station," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The systems and methods disclosed herein enable users to increase their productivity and effectiveness, while minimizing wasted time and effort during decision-making and/or achievement of one or more goals. In one aspect, the systems include a network based (e.g., cloud-based) background expert that can be utilized for analyzing a user's voice and data communications, historical data, public data, user preferences, and the like, to provide solutions or recommendations that maximize the user's ability to efficiently meet their goals.

Aspects or features of the subject innovation can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the subject innovation can be exploited in legacy telecommunication technologies.

Referring initially to FIG. 1, there illustrated is an example system 100 that includes a background expert (BEX) system 102 for inferring user's goals and/or decisions, and providing results and/or recommendations based on the inferred data. According to an aspect, at least a portion of the BEX system 102 can reside within a network, for example, a cloud. As an example, a cloud can include resources (e.g., processing resource(s), data storage resource(s), etc.) that can reside on-premise or off-premise at a service provider location. Moreover, the cloud can be, but is not limited to, a public cloud, a private cloud, an inter-cloud, or a hybrid cloud. Typically, users can opt-in to utilize the BEX system 102, by adjusting appropriate privacy settings.

In one embodiment, the BEX system 102 can include a monitoring component 104 that can track and/or monitor public and/or user data (110, 112). As an example, public data 110 can include, but is not limited to, traffic data, weather information, news reports, etc. and/or most any publicly available data, for example, accessed from web servers or public data stores. Further, user data 112 can include, but is not limited to, real-time user communications (e.g., voice calls, short message service (SMS) messages, chat records, Instant Messaging (IM) data, multimedia message service (MMS) messages, social network data, etc.), user location data, user schedule, user preferences, etc. Typically, user data 112 can be received from one or more user equipments (UEs) associated with a user (e.g., devices linked to a user subscription or account) via most any wired or wireless network. In one aspect, the monitoring component 104 can observe user data 112, without receiving an explicit input by the user, for example, monitor user data in the background. However, it can be appreciated that explicit commands or instructions from the user can also be received.

The BEX system 102 can further comprise an analysis component 106 that can identify, predict, and/or infer a user's goal(s) or desired actions, based on an analysis of the public data 110 and/or the user data 112. As an example, the analysis component 106 can analyze data such as, but not limited to, voice calls, data sessions, profile information, patterns of use, historical data, user or service provider preferences, public or user-accessible network server (e.g., web servers, application servers, email servers, etc.) and/or data stores, etc., and provide real-time suggestions, recommendations information, schedule management, system management, modifications, results, etc., based on the analysis. In one aspect, the analysis component 106 can receive real-time user communication data, for example, a conversation during a user's voice call or data session (e.g., tracked by the monitoring component 104), utilize natural language processing to understand the conversation/communication, and determine an area where expert knowledge could enhance the understanding of those involved or improve the probable outcome of plans being made. In another aspect, the analysis component 106 can identify a goal of a user or an action desired to be implemented by a user, based on the analysis. In yet another aspect, the analysis component 106 can determine conflicts and provide optimized solutions that can be customized for a user. Additionally or alternatively, the analysis component 106 can analyze data sessions for cues. Further, the analysis component 106 can utilize dynamically changing data, such as, but not limited to, location data (e.g., geographical location) associated with the user, time or date information, etc., for the analysis.

Furthermore, the analysis component 106 can also access services and/or applications subscribed by the user for the analysis.

A results component 108 can be employed to provide or implement a result of the analysis (e.g., by the analysis component 106). Moreover, the result(s) can be provided/implemented in real-time or near real-time. Typically, the results component 108 can interact with the user in various ways. For example, the results component 108 can deliver a visual or an audio indication (e.g., indicative of a solution, recommendation, suggestion, and/or authorization for implementing an action, etc.) at a device being utilized by the user. In one aspect, the results component 108 can add itself as an additional participant in an ongoing voice call, chat window, or data session, and can interject when appropriate. As an example, indication can be received (e.g., heard, read, etc.) by all or some of the other participants. The results component 108 can also provide indications after completion of the voice call, chat, or data session. Typically, the manner in which the results component 108 provides the results of the analysis to the user or implements the results can be based on predefined user preferences. Typically, the user can specify his/her preferences during an initialization procedure (or at any other time). Alternatively, the user preferences can be learnt by observing user behavior over a period of time. In one example, the results component 108 can automatically perform an action or implement a change (identified based on the analysis). In another example, the results component 108 can provide an indication to the user and wait for authorization before performing the action or implementing the change.

Figure 2:
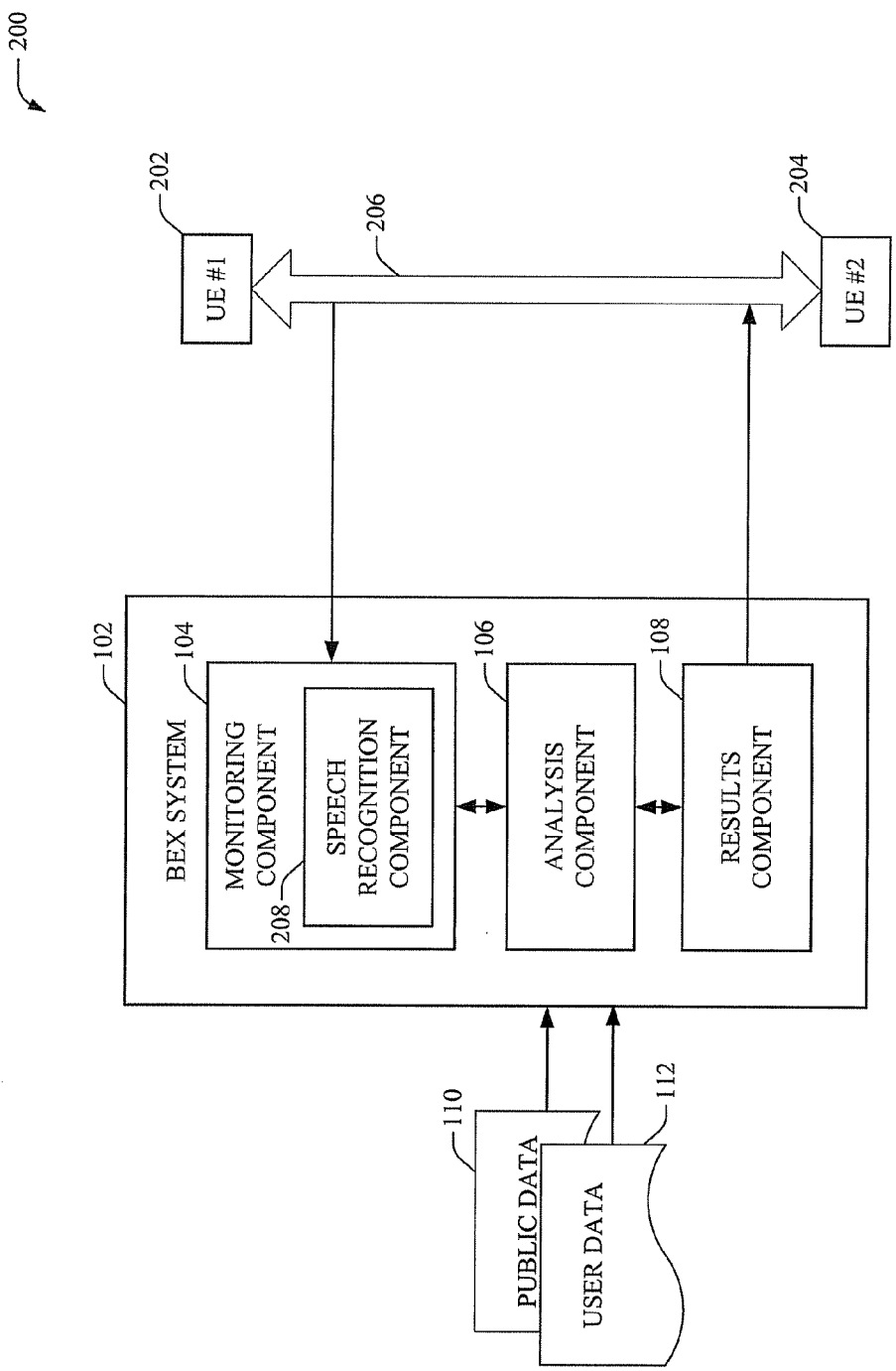
FIG. 2 illustrates an example system that can be utilized for improving user productivity based on an analysis of user communication.

Referring now to FIG. 2, there illustrated is an example system 200 that facilitates improving user productivity based on an analysis of user communication, in accordance with an aspect of the subject disclosure. It can be appreciated that the BEX system 102, the monitoring component 104, the analysis component 106, the results component 108, the public data 110, and the user data 112, can include functionality, as more fully described herein, for example, with regard to system 100. As discussed herein, the BEX system 102 can reside partially or completely within a network/cloud that can be coupled to a core communication network. However, it is to be noted that the subject disclosure is not so limited and that although the BEX system 102 is depicted to reside outside the UEs (202, 204) (e.g., within a cloud), it can be appreciated that at least portions of the BEX system 102 can reside within one or more UEs (202, 204).

According to an aspect, monitoring component 104 can observe a communication between two or more users. For example, a first user via UE #1 202 can communicate with a second user via UE#2 204, over a communication network(s) 206 (e.g., wired or wireless network). Moreover, the communication can be a voice call, text messaging, a video call, an email message, and/or the like. The monitoring component 104 can observe all outgoing and/or incoming communication, associated with a first user, based on verification of privacy settings of the first (and/or second) user. For example, the first user can opt-in and/or authorize the monitoring by the monitoring component 104. Additionally, in one aspect, the monitoring component 104 can monitor a communication between multiple parties, only if all the parties have authorized the monitoring.

Typically, a UE (202, 204) can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UE (202, 204) can also include LTE based devices, such as, but not limited to, most any home or commercial appliance that includes an LTE radio. It can be appreciated that the UE (202, 204) can be mobile, have limited mobility and/or be stationary.

According to an aspect, the monitoring component 104 can track and/or detect any data, conditions, and/or actions that facilitate determination of a goal that a user (e.g., first user) is attempting to and/or desires to accomplish. Typically, the monitoring component 104 can observe data, conditions, and/or actions associated with the user, in the background, without requesting or receiving explicit input from the user. Moreover, the user does not need to activate, start, turn on, open, etc. a specific application to initiate the monitoring. Additionally or alternatively, the monitoring component 104 can also receive an explicit input from the user (e.g., the first user via UE#1 202) indicative of a request for information associated with the user's goal and/or a request to implement an action. In one embodiment, the monitoring component 104 can observe and/or detect changes or modifications made by a user on one or more UEs. For example, the monitoring component 104 can identify that the first user has scheduled an appointment for a specific time in a calendar via UE#1 202. In another example, the monitoring component 104 can observe and/or track changes in user location, e.g., based on location of UE#1 202.

Further, the monitoring component 104 can detect conversations (e.g., voice, text, chat, etc.) associated with the user. For example, the monitoring component 104 can monitor (e.g., continuously) communication between the first user and a second user. Although only two UEs (202, 204) are depicted in the communication, it can be appreciated that the communication can be between multiple UEs. In one aspect, for voice communications, for example, voice calls, a speech recognition component 208 can be utilized to convert the voice into corresponding text. Typically, the communication can be streamed live to the speech recognition component 208, which in turn can dynamically convert the speech within the communication to text. According to an embodiment, the speech recognition component 208 can identify each word within the communication and generate a word-for-word textual data. As an example, the speech recognition component 208 can utilize automatic voice/speech recognition techniques, based on an analysis of the communication to generate a textual string/segment/script (e.g., group of words, phrases sentences, etc.). Typically, a statistical model, such as, but not limited to the Hidden Markov Model (HMM), can be utilized by the speech recognition component 208 for speech recognition and conversion of the speech to text. In addition, the speech recognition component 208 can also utilize most any voice recognition techniques to distinguish between voices of different users within a conversation.

The analysis component 106 can utilize the monitored information, public data 110 and/or user data 112 to identify a goal(s) of user. Typically, the analysis component 106 can also determine one or more solutions and/or paths to accomplish the goal(s). As an example, the analysis component 106 can utilize natural language processing techniques to understand the communication to facilitate identification of the goal(s). In one aspect, the analysis component 106 can detect keywords, such as, but not limited to, phrases, e.g., "let's meet," "have dinner,", "movies," etc.; timing or date indicators, e.g., "Saturday," "7:30 PM," "in an hour," etc.; location indicators "the mall," "XYZ restaurant," "my gym," etc. Based on an analysis of these keywords along with public data 110 and/or user data 112, the analysis component 106 can identify and/or predict an action desired by the user and determine one or more solutions or additional information associated with accomplishing the action/goal(s).

In one aspect, based on user preferences or default settings, the results component 108 can (i) automatically accomplish the action/goal(s) in an optimal manner; (ii) provide an indication to a user (e.g., via UE#1 202) requesting authorization to accomplish the goal in a selected manner; and/or (iii) provide a recommendation to the user (e.g., via UE#1 202), indicative of an optimal manner in which to accomplish the goal, on determining that the user is attempting to accomplish the action/goal(s) in a non-optimal manner. Typically, the results component 108 can perform action/goal(s) and/or provide indication(s) in real-time (or almost in real-time). For example, the monitoring component 104 can observe an on-going conversation between two or more users, and the analysis component 106 can infer and/or identify a goal that is to be accomplished. Moreover, the analysis component 106 can generate a solution or addition information associated with the goal, which can be provided to the one or more users as part of the conversation (e.g., after a user has completed a sentence) by the results component 108.

Consider an example scenario, wherein two users are on a voice call via UEs (202,204) and are making dinner plans for 7 PM that evening, during their conversation. They agree that they should meet at a restaurant roughly halfway (e.g., equal drive time) between them. During their planning, the monitoring component 104 can observe their conversation, the speech recognition component can convert the voice data into text, and the analysis component 106 can utilize natural language processing schemes to understand the plans and identify the goal. Moreover, the analysis component 106 can determine additional information, such as, available reservation times at the restaurant being considered, real-time or historical traffic patterns between the restaurant and the users, local weather forecasts, etc. Further, the results component 108 can wait for an appropriate time and join the conversation, for example, indicating (e.g., via audio, video, text, and/or display signals) that there are no available reservations at the restaurant between 6:30 and 8:00. Furthermore, the analysis component 106 can determine, based on public data 110, that there is a traffic accident between one of the users and the restaurant, which will increase their travel time, and thus identify a set of similar or user-preferred restaurants with available reservation times at 7 PM, which are located on routes that avoid the traffic congestion and are still approximately halfway between both users. The results component 108 can notify the users, and if one or more of the users approve, the BEX system 102 can make the reservation. Alternatively, the BEX system 102 can automatically make the reservation and then notify the users of the reservation details and/or directions to the restaurant from their respective locations.

Figure 3:
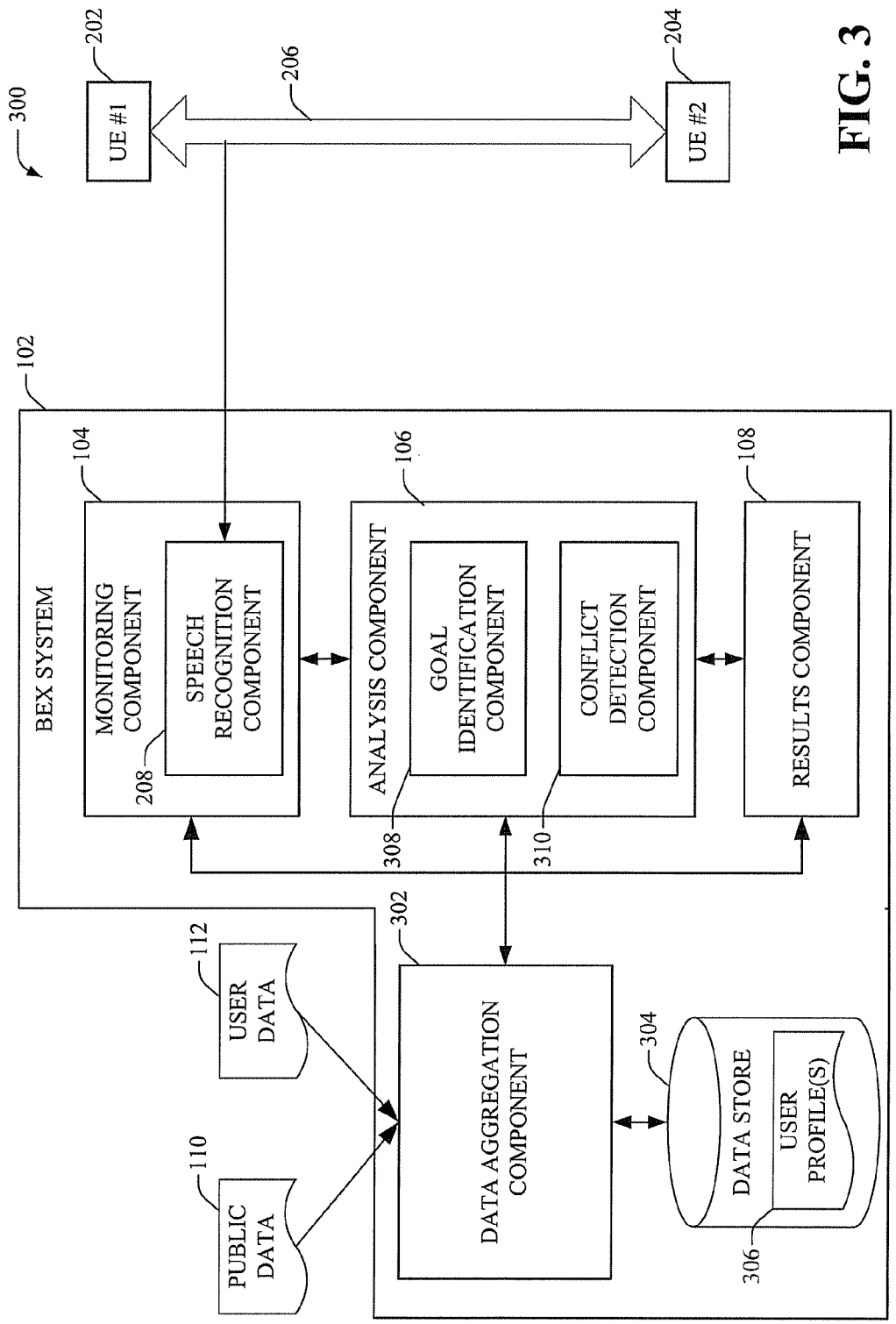
FIG. 3 illustrates an example system that can detect and/or accomplish user-desired actions based in part on user communication data.

Referring now to FIG. 3, there illustrated is an example system 300 that can detect and/or accomplish user desired actions based in part on user communication data, according to an aspect of the subject disclosure. Typically, the BEX system 102 enhances the ability of users to make the most optimal decisions by dynamically providing the user with information relevant to the decision making. In one aspect, the BEX system 102 can behave as a virtual entity that can be added into a user's conversations and can provide information or perform actions based on an analysis of the user's conversation. According to an embodiment, the BEX system 102 can eliminate the need for a user to download separate applications (apps) on a UE and can create a new market where the apps, subscribed by a user, are integrated into the BEX system 102, such that, developers can be paid based on how many times their app is used and/or their services are accessed. Typically, the more sources of data that are made available, the more powerful and intelligent the BEX system 102 can become. It can be appreciated that the BEX system 102, the monitoring component 104, the analysis component 106, the results component 108, the public data 110, the user data 112, the UE#1 202, the UE#2 204, and the communication network(s) 206, can include functionality, as more fully described herein, for example, with regard to systems 100 and 200.

The monitoring component 104 can dynamically monitor and/or track user communications, in the background (e.g., without active initiation by a user, without an explicit action/request by user, and/or without interruption or with minimal interruption to user activities). Typically, the speech recognition component 208 can perform speech-to-text conversion and the analysis component 106 can utilize a natural language processing technique to understand content and/or context of the textual data. In particular, a goal identification component 308 can be utilized to determine and/or predict one or more goals of a user. Moreover, goals of the user can include actions that the user desires to perform and/or additional information that can facilitate decision-making. In addition, a conflict detection component 310 can identify whether the goals of the user conflict with any other user actions or parameters. In an aspect, a data aggregation component 302 can collect data (public data 110 and/or user data 112) relevant to the user goals. Further, the data aggregation component 302 can collect user profile(s) 306, stored in a data store 304. The user profile(s) 306 can comprise most any data related to the user, which can facilitate customizing goal identification, conflict identification, and/or solution/action determination. For example, the user profile(s) 306 can include user preferences, historical data, user behavior, UE parameters, etc. The user profile(s) 306 can also include a list of services/applications, to which a user is subscribed. As an example, the BEX system 102 can receive the user profile data from the user and/or generate user profile data based on machine learning techniques.

For example, during communication, a first user can make plans with a second user to watch a movie at a particular theatre. In this example scenario, the goal identification component 308 can determine that the goal of the user is to watch the specific movie at the specific theatre. Accordingly, based on an analysis of data collected by the data aggregation component 302, the results component 108 can automatically purchase tickets for the movie, or provide an indication to one or more of the users to authorize the purchase. Moreover, on receiving authorization, the results component 108 can purchase the movie tickets and provide confirmation to the one or more users. In another example, the conflict detection component 310, can identify a conflict with respect to the user's goal, for example, determine that the movie at the particular theatre is sold out, and/or determine, based on the user's location and real-time traffic data, that the user will not be able to reach the theatre in time for the movie, and/or determine that the user has a previously scheduled appointment at the time, etc. On detecting a conflict, the conflict detection component 310, can determine a solution to resolve the conflict, for example, identify another theatre that is playing the movie, where tickets are available for purchase or which is closer to the user's location, etc. The results component 108 can provide the solution and/or any additional data that can facilitate the user making an informed/educated decision to one or more of the users via UEs (202, 204) (or any another user devices). In one example, the results component can utilize voice synthesis to generate a speech signal indicative of the indication(s), solution(s), and/or additional information, which can be played during the communication (e.g., voice/video call). Moreover, BEX system 102 can add itself as an additional participant in the communication and play the speech signal. Typically, the speech signal can be heard by all or some of the other participants.

In yet another aspect, the analysis component 106 can utilize and/or poll various services/applications subscribed by the user. Specifically, the analysis component 106 can facilitate goal or conflict identification based on data provided by services or application that the user has subscribed to. For example, the analysis component 106 can check availability of the movie tickets via a "show times" application and determine directions and/or traffic conditions via a "maps" application. Further, in an example scenario, the analysis component 106 can also determine that the movie is available via a "movie rental" application, to which the user is subscribed, and the results component 108 can accordingly recommend that the user can watch the movie via the "movie rental" application. As an example, the results component 108 can add the movie title into a DVD or online queue.

Figure 4:
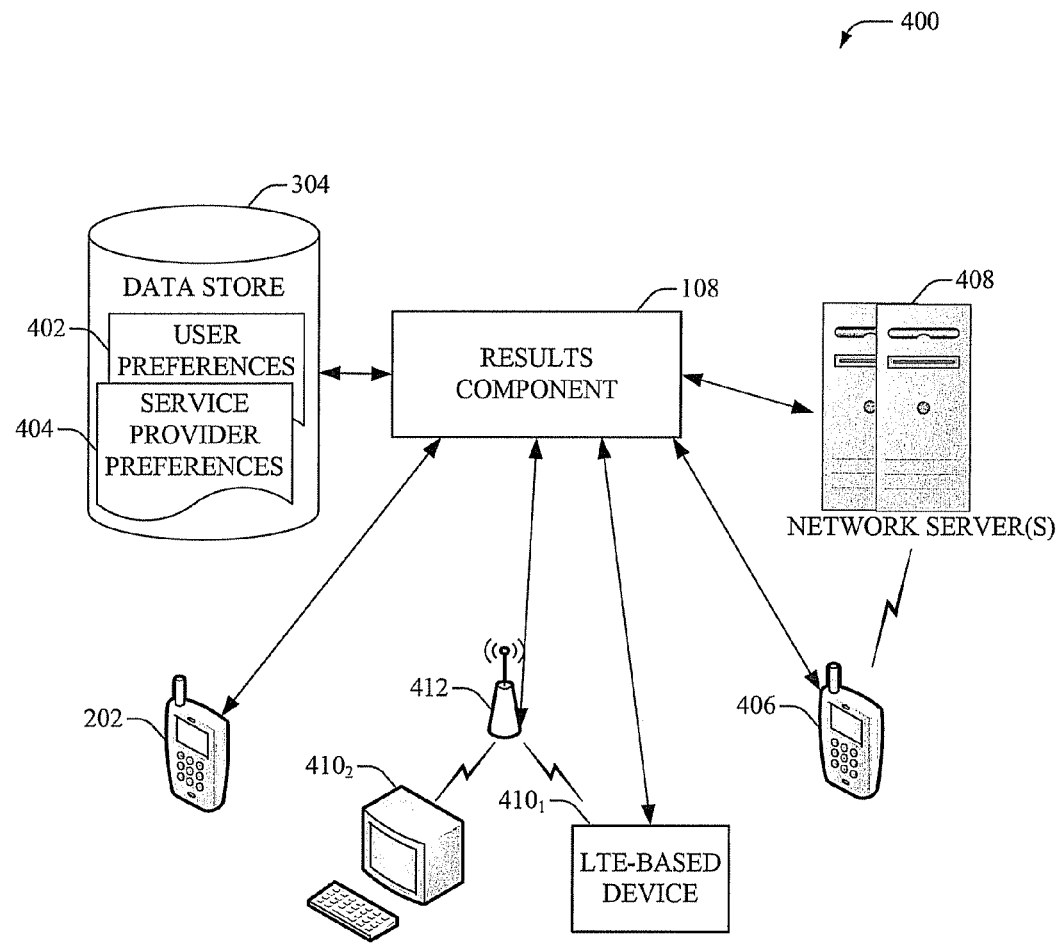
FIG. 4 illustrates an example system that facilitates delivery of results or solutions to improve efficiency of user-desired tasks.

FIG. 4 illustrates an example system 400 that facilitates delivery of results or solutions to improve efficiency of user-desired tasks, according to an aspect of the subject innovation. Typically, the results component 108 can provide indications or solutions associated with a task desired to be performed by a user. In addition, the results component 108 can request authorization to perform a task and/or automatically perform the tasks. Moreover, results component 108 and data store 304 can include functionality, as more fully described herein, for example, with regard to systems 100-300.

According to an aspect, the results component 108 can access user preferences 402 and/or service provider preferences 404 to determine whether a task/action can be automatically performed or whether user authorization/confirmation is required. In one aspect, if user authorization/confirmation is required, the results component 108 can provide an indication to the user, for example, via UE 202. The indication can be an audio, video, multimedia, text, and/or graphical data that requests authorization from a user. In one aspect, the indication can provide a set of solutions and request that the user select one of the solutions to be performed. In one example, the indication can be provided as a voice message to one or more participants, during a voice call. Moreover, the results component 108 can interrupt a conversation between two or more participants, at an appropriate time, to provide suggestions, recommendations and/or solutions to a user-desired task. As an example, the one or more participants can send an authorization and/or further query the BEX system 102 on receiving the indication. The BEX system 102 (via the analysis component 106), can re-evaluate user's goals and provide a new solution (via the results component 108).

The results component 108 can perform various actions and/or tasks, and/or provide instructions and/or commands to one or more devices. For example, the results component 108 can transmit data to a disparate UE 406 that can be associated with the user (or another user), via most any wired or wireless communication network. In another example, the results component 108 can deliver text messages (SMS, MMS, email, chat, etc.) to the UE 406, for example, via one or more network servers 408. Additionally, the results components can also deliver data (e.g., instructions to perform the action/task), to web servers or application servers, included within the network servers 408. Furthermore, the results component 108 can deliver data (e.g., instructions to perform the action/task) to one or more user devices ($410_1$-$410_2$) that are connected to a user's femto access point 412. The devices connected to the femto access point 412 can include but are not limited to most any UE (e.g., $410_2$) and/or an LTE-based device $410_1$, such as, an appliance, industrial equipment, etc. It can be appreciated that the subject disclosure is not limited to the above noted examples and that the results component 108 can deliver data to and/or program most any device and/or application.

Figure 5:
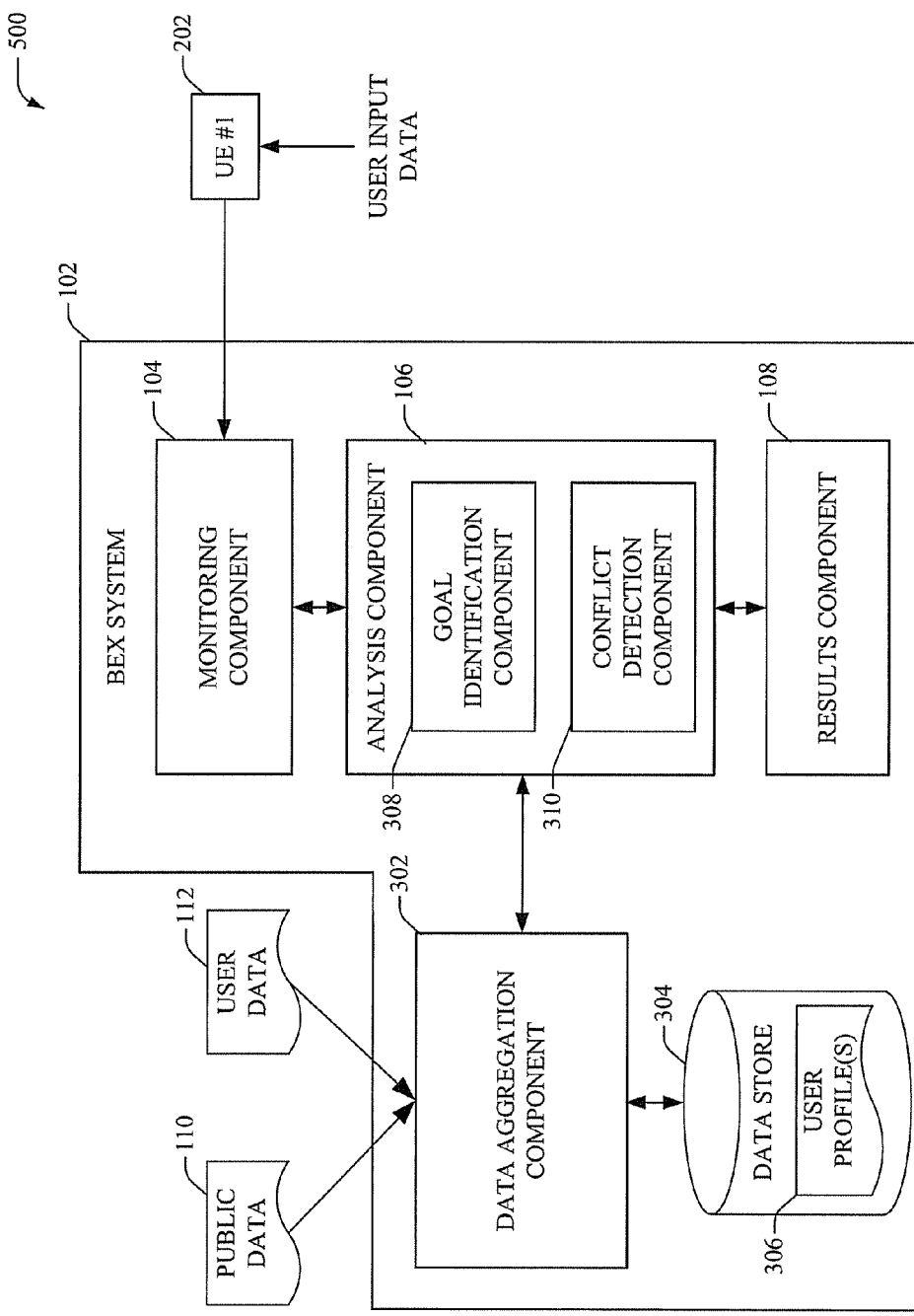
FIG. 5 illustrates an example system that can detect and/or accomplish user-desired actions based in part on user input data.

Referring now to FIG. 5, there illustrated is an example system 500 that can detect and/or accomplish user desired actions based in part on user input data, according to an aspect of the subject innovation. Typically, the BEX system 102 can monitor various parameters associated with a user to identify user goals (e.g., with or without explicit user indication) and perform actions that facilitate optimally accomplishing the user goals It can be appreciated that the BEX system 102, the monitoring component 104, the analysis component 106, the results component 108, the public data 110, and the user data 112, the UE 202, the data aggregation component 302, the data store 304, the user profiles 306, the goal identification component 308 and/or the conflict detection component 310, can include functionality, as more fully described herein, for example, with regard to systems 100-400.

According to an aspect, the monitoring component 104 can monitor and/or track various parameters associated with one or more UEs of a user. The parameters can include, but are not limited to, location data and/or user input data. Moreover, user input data can include most any data, for example, selection, instruction, command, preference, etc. input or generated by a user on the one or more UEs (e.g., UE 202). Moreover, the analysis component 106 can evaluate the monitored parameters, identify/infer a user goal (e.g., via goal identification component 308) and/or identify conflicts (if any) during accomplishment of the goal (e.g., via the conflict detection component 310), and the results component 108 can perform an action and/or deliver data, based on the evaluation.

The following non-limiting examples can describe various embodiments of system 500. In one example, the monitoring component 104 can identify that a user visits a specific salon for a hair cut appointment by the same person every two months, based on parameters, such as, but not limited to, location data, calendar data, schedules, credit card data, etc. associated with the user. Once the BEX system 102 has identified the last time the user had a haircut, the analysis component 106 can examine the user's schedule (e.g., via user data 112) around two month's from that date, and the results component 108 can schedule an appointment for the user at the best possible time based on their schedule, preferences, and/or available appointment times. Moreover, the results component 108 can then alert the user of the addition to their schedule, for example, via UE 202. In one aspect, the user can confirm the changes to their schedule or can provide the BEX system 102 with additional parameters to modify or reschedule the appointment.

In another example, the monitoring component 104 can detect a user entry in a memo or list on UE 202 (or accessible via UE 202). Typically, a user can generate or update a grocery list for a shopping trip. According to an aspect, the analysis component 106 can examine the items on the grocery list and analyze item costs at local grocery stores along with coupons and/or deals on the items, estimate the value of the gas that will be used to travel to each of the different grocery stores, and identify a grocery store that offers the greatest overall savings. Moreover, the results component 108 can provide a notification to the user, for example, via UE 202, indicative of the location and/or directions to the grocery store. Additionally or optionally, the results component 108 can also send digital copies of the appropriate coupons to the UE 202 or a disparate device selected by the user.

Further, in yet another example, the monitoring component 104 can track, in real-time, a user's location and/or motion/speed based on location data (e.g., Global Positioning System (GPS) data) received from UE 202. Based at least in part on the monitored location data, the user's schedule, user profile(s) 306, and/or historical data, etc. the analysis component can identify that the user will be out of his/her house for a specific time period. Accordingly, the results component 108 can automatically maximize the user's energy savings by communicating with the user's utility company and/or controlling the smart appliances in the user's house (e.g., via most any wired or wireless communication network). Furthermore, the analysis component 106 can determine an amount of time required to transition the house from its current temperature and/or humidity to the comfortable settings chosen by the user. Moreover, the analysis component 106 can determine and/or predict the user's time of arrival at the house based on the monitored location, traffic on the user's path home, the user's schedule, historical data, user preferences, etc., and identify the appropriate time to begin adjusting the temperature and humidity. The results component 108 can deliver the appropriate instructions to implement the temperature and/or humidity adjustments.

Furthermore, in still another example, the monitoring component 104 can monitor a user's location/motion/speed, last accessed maps/directions, flight schedules, credit card purchases, data from travel apps, etc., and the analysis component 106 can determine that the user is driving towards the airport to board a specific flight. In one aspect, the conflict detection component 310 can access real time traffic, weather, and/or flight status data (e.g., via websites and/or applications/services subscribed by the user) to identify any changes that can be implemented by the user to more optimally reach the airport in time to board the flight. For example, the conflict detection component 310 can advise the user alternate routes to the airport, such that, the user can reach the airport in time for the flight, based on real time traffic, flight delays or status, time for security clearance/check-in, etc.

Figure 6:
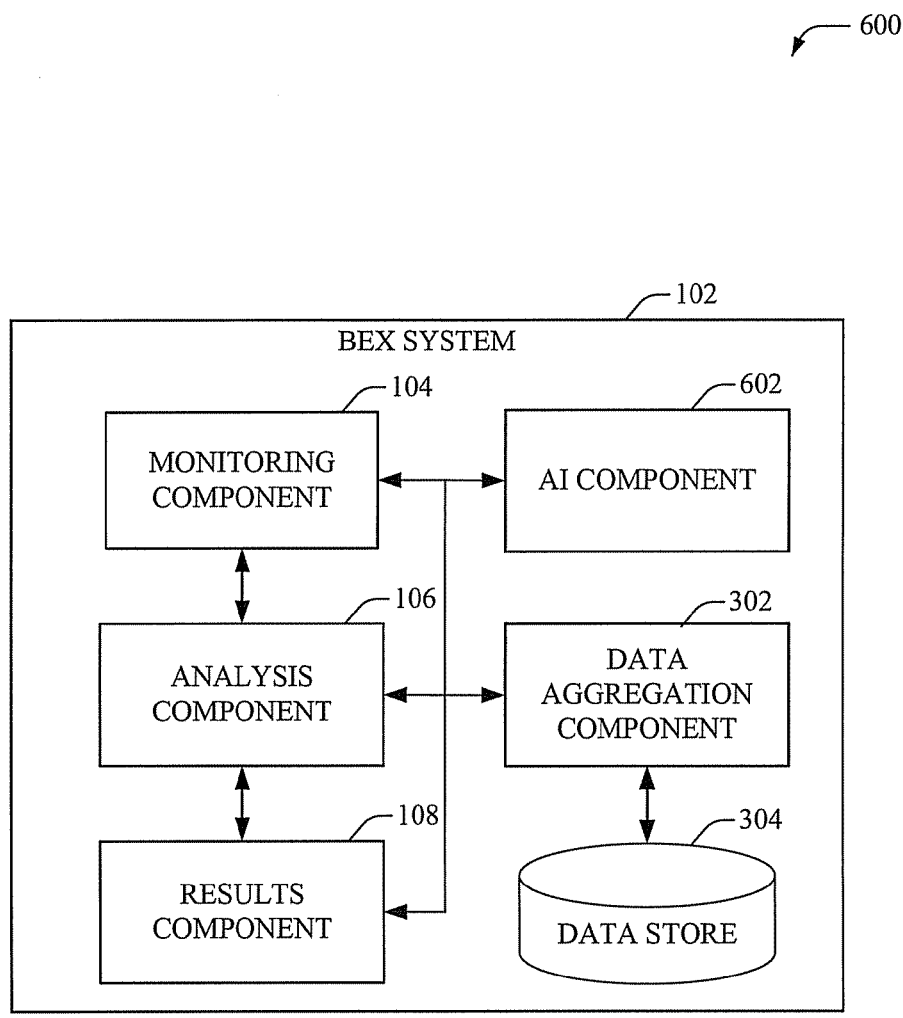
FIG. 6 illustrates an example system that facilitates automating one or more features in accordance with the subject innovation.

FIG. 6 illustrates an example system 600 that employs an artificial intelligence (AI) component 602, which facilitates automating one or more features in accordance with the subject innovation. It can be appreciated that the BEX system 102, the monitoring component 104, the analysis component 106, the results component 108, the data aggregation component 302, and the data store 304, can include functionality, as more fully described herein, for example, with regard to systems 100-500.

The subject innovation (e.g., in connection with predicting user goal(s), accomplishing goal(s), identifying and resolving conflicts, etc.) can employ various AI-based schemes for carrying out various aspects thereof. For example, a process for identifying an action or task desired to be performed by a user can be facilitated via an automatic classifier system and process. Moreover, the classifier can be employed to determine a user goal, an action or task to accomplish the user goal, additional information, recommendations, suggestions, and/or solutions associated with accomplishing the goal, conflicts associated with the goal, solutions to resolve the conflicts, etc.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information (e.g., public data 110, user data 112, user profiles 306, etc.) aggregated by the data aggregation component 302 and the classes can be categories or areas of interest (e.g., levels of priorities, user preferences, etc.).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, user interaction, UE location, user schedules, historical data, receiving extrinsic information, etc.). For example, SVM's are configured via a learning or training phase within a classifier constructor and feature selection module. Thus, the classifier(s) can be used to automatically learn and perform a number of functions, including but not limited to determining according to a predetermined criteria an goal that a user is attempting to accomplish, a set of solutions to accomplish the goal, an optimal solution for efficiently accomplishing the goal, additional information, suggestions, and/or recommendations that enable the user to make an informed decision associated with efficiently/optimally accomplishing the goal, an action/task that automatically accomplishes the goal, a conflict associated with the goal, a solution associated with the conflict, an action/task and/or addition information that facilitates conflict resolution, etc. The criteria can include, but is not limited to, historical patterns, UE behavior, user preferences, service provider preferences and/or policies, user service/application subscriptions, UE device parameters, location/motion of the UE, day/date/time, etc.

Figure 7:
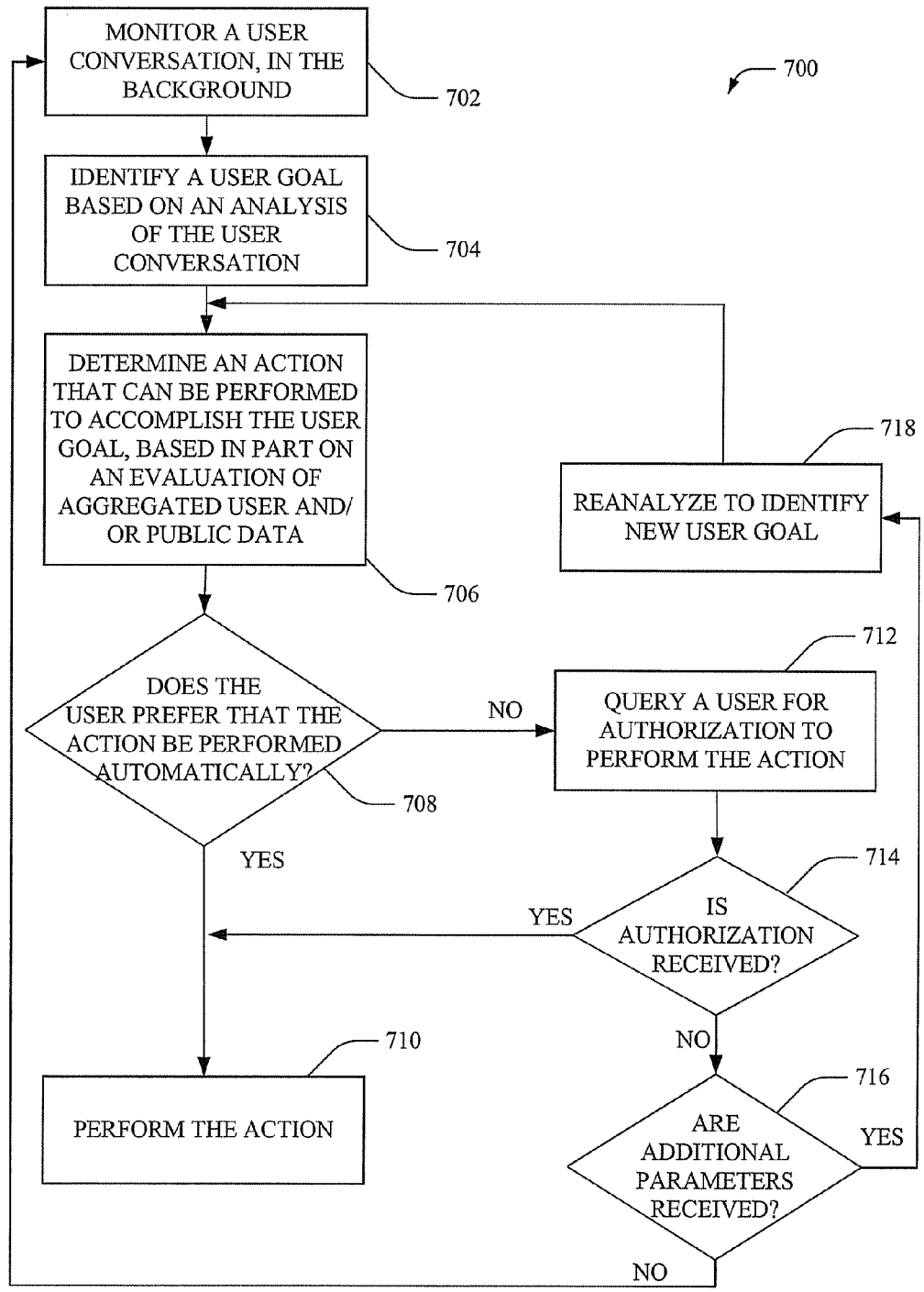
FIG. 7 illustrates an example methodology that performs actions, which facilitate accomplishment of a user goal.
Figure 8:
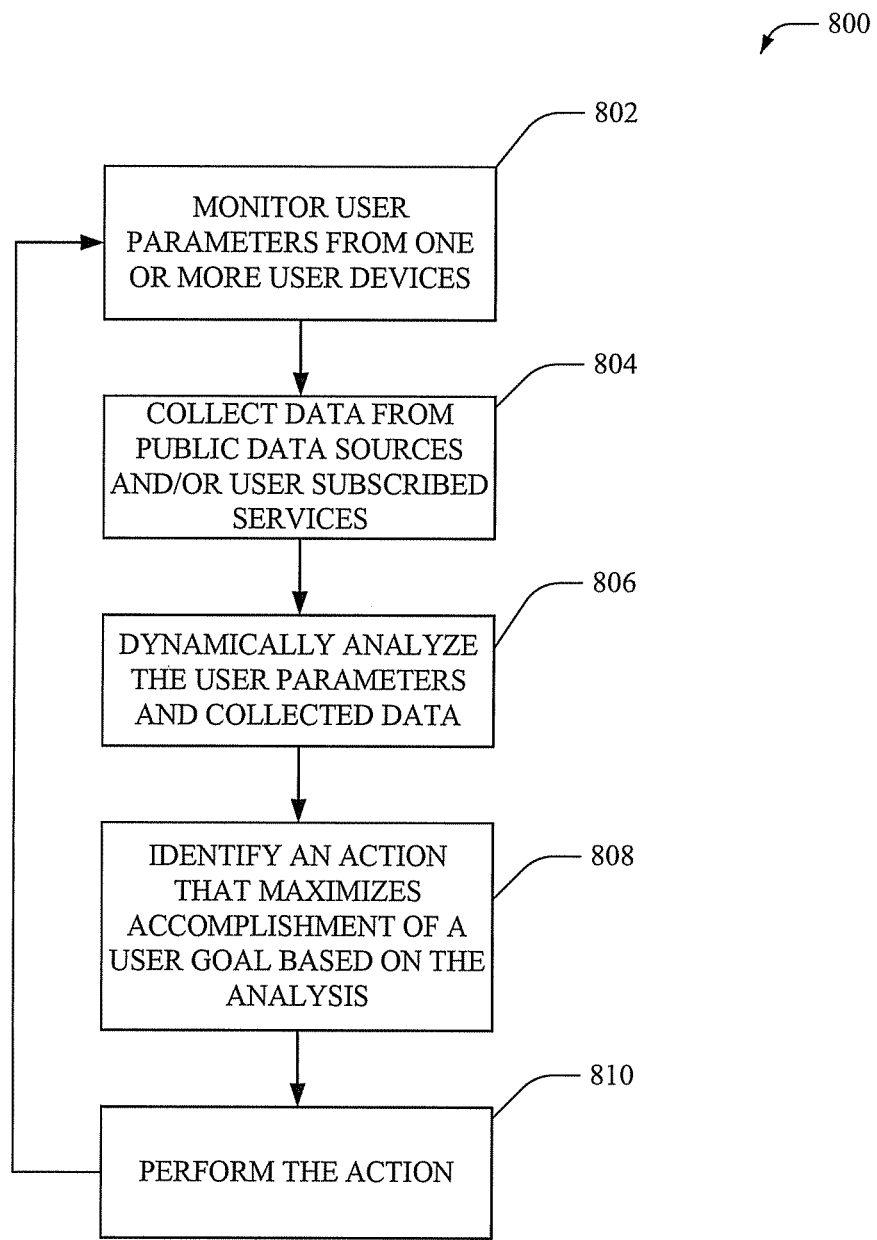
FIG. 8 illustrates an example methodology that provides a background expert for automatically and dynamically inferring and/or accomplishing user goals.
Figure 9:
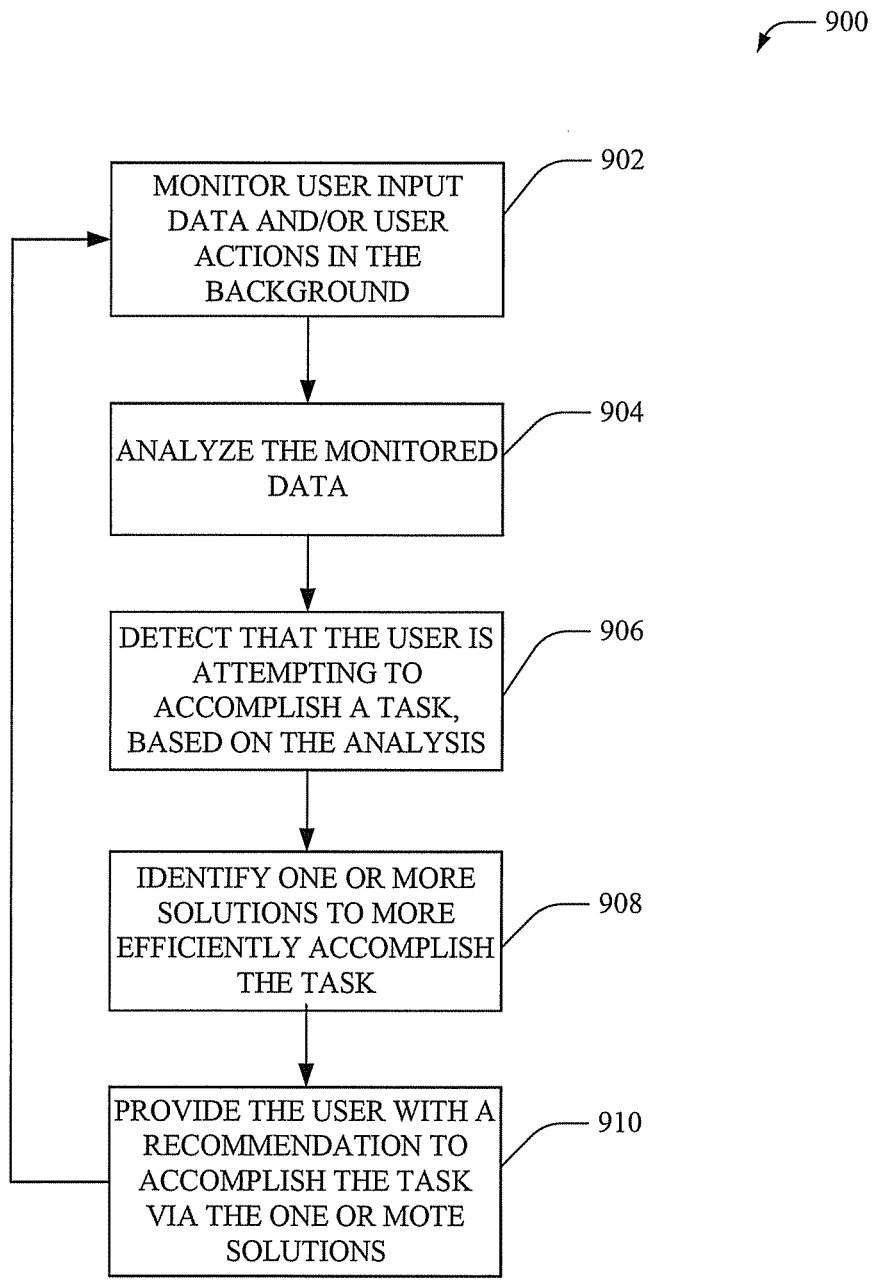
FIG. 9 illustrates an example methodology that facilitates providing recommendations to more efficiently accomplish one or more user tasks.

FIGS. 7-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

FIG. 7 illustrates an example methodology 700 for performing actions that facilitate accomplishment of a user goal, according to an aspect of the subject specification. Typically, at least portions of methodology 700 can be implemented within a network (e.g., cloud), that includes one or more resources communicatively and/or remotely coupled to a UE. At 702, a user conversation can be monitored. As an example, the user conversation can include a communication between two or more UEs, including, but not limited to, a voice call, a video call, a text message thread, instant messenger chat, etc. Typically, the user conversation can be monitored in the background, for example, with minimal interference to a user and/or without the user actively or explicitly having to switch on, open, start, and/or initiate a monitoring application.

At 702, a user goal can be identified based on an analysis of the user's conversation(s), for example, based on natural language processing. Further, at 706 an action, to be performed for accomplishing the identified user goal, can be determined, based on evaluation of aggregated user and/or public data. The user and/or public data can include data relating to accomplishing the user goal that can be received from local and/or remote data sources. Typically, identification of the user goal and the action can be performed in real-time by utilizing most any statistical, predictive and/or machine learning models. At 708, it can be determined whether the user prefers that the action be performed automatically, for example, based on predefined user preferences. If determined that the user prefers that the action be performed automatically, at 710, the action can be performed. As an example, the action can include providing additional information, instructing/programming a device, scheduling an appointment, etc. Alternatively, if determined that the user does not prefer automatic action implementation, at 712, the user can be queried to request an authorization to perform the action. As an example, the user can also be provided with additional information (e.g., suggestions or recommendations) indicative of alternative methods to accomplish the user goal. In one aspect, the request and/or additional information can be delivered as a speech signal during a voice call (to one or more of the participants). Moreover, at 714 it can de determined whether authorization is received. On receiving authorization, at 710, the action can be performed, and accordingly the user goal can be accomplished. Alternatively, if authorization is not received, at 716, it can be determined whether additional parameters are received. The parameters can be received explicitly, for example, the user can actively submit a query during the conversation, or implicitly, based on further analysis of the conversation. If additional parameters are not received, the methodology 700 continues to monitor the conversation. In contrast, if additional parameters are received, at 718, the user conversation and the additional parameters can be reanalyzed to identify a new goal, and the methodology 700 can proceed to determine an action to accomplish the new goal at 706.

In one example, during a voice call, the user can mention, "Sounds great. Lets discus this at noon tomorrow in the conference room." Accordingly, the methodology 700 can identify that the user's goal would be to schedule a meeting at 12:00 pm on a specific date at a conference room. Moreover, an action to add the meeting as an appointment in the user's calendar and/or reserve the conference room at the scheduled time can be determined. If the user preferences indicate that the action can be performed automatically, the calendar can be updated and/or conference room can be reserved; else, the user can be prompted during or after the voice call to authorize the action. For example, a message, such as, but not limited to "Would you like to update your calendar with a meeting", "Would you like to reserve the conference room for your meeting?" etc., can be played to one or more participants of the voice call. On receiving authorization, the actions can be performed. Further, the user can provide additional parameters, for example, "Can you add John Smith to this meeting?", "which of the three conference rooms are available at 2 PM today?" etc. Based in part on the additional parameters, a new user goal can be identified and the methodology repeated.

Referring now to FIG. 8, illustrated is an example methodology 800 that provides a background expert for automatically and dynamically inferring and/or accomplishing user goals, according to an aspect of the subject disclosure. Typically, methodology 800 can be implemented as a network-based (e.g., cloud-based) service. At 802, user parameters from one or more user devices can be monitored. The user parameters can include, but are not limited to, user schedules, user preferences, location data, messaging data, social media data, historical data, purchase history, etc. At 804, data from public data sources and/or user-subscribed services can be collected. As an example, the data can include publicly available data, such as, but not limited to, news, weather, traffic, product information, maps, etc. and/or data provided by a service or application subscribed by a user, for example, restaurant reservation services, movie rental services, bank account management services, medical records, etc. At 806, the user parameters and/or collected data can be analyzed (e.g., by employing an artificial intelligence technique), and at 808, an action that can maximize efficient/optimal accomplishment of a user goal can be identified based on the analysis. Typically, the methodology 800 can identify the best or most optimal course of action, given the user goal and/or user parameters. Further, at 810, the action can be automatically performed.

For example, user parameters, such as, a user's prescription information, medical insurance data, and/or credit card purchase receipts at a specific pharmacy can be monitored, in the background. Further, data from various sources, such as, medicine information, pharmacy sales or coupons, route or traffic to pharmacy location can be collected. Furthermore, if a user has subscribed to an application associated with a pharmacy for prescription management, user specific data (e.g., refill number, number of refills left, historical purchase data, etc.) can be determined by utilizing the application (e.g., by directly accessing an application server). Based on a real-time (or near real-time) analysis of the user parameters and the collected data, it can be identified that a user is likely to request for a prescription refill in the next couple of days. Accordingly, a pharmacy closest to the user's location, having a lowest price on the user's medicine can be identified and/or a refill request for the prescription can be submitted to the identified pharmacy (e.g., automatically or after receiving authorization from the user) and a confirmation can be delivered to the user.

FIG. 9 illustrates an example methodology 900 that facilitates providing recommendations to more efficiently accomplish one or more user tasks in accordance with an aspect of the subject specification. At 902, user input data and/or user actions can be monitored in the background. As an example, the user input data can include user conversations, preferences, settings, etc. At 904, the monitored data can be analyzed, for example, with additional user related data received from various data sources. Typically, cloud-computing resources can be utilized to perform the analysis in real-time. At 906, it can be detected that a user is attempting to accomplish a task. For example, it can be identified that the user is attempting to schedule a lunch meeting at 1 PM with two other friends at a particular restaurant. At 908, one or more solutions to more efficiently accomplish the task can be identified. Continuing with the above example, it can be determined, based on the location and/or traffic data, that not all the guests are likely to reach the particular restaurant at 1 PM. Accordingly, estimated arrival times for all the guests can be calculated and availability for a lunch reservation at the new time can be verified. At 910, a recommendation can be provided to the user to accomplish the task via the one or more solutions. In the above example, an indication recommending a new reservation time at the particular restaurant can be provided. Additionally, reservations for 1 PM for different restaurants (e.g., with the similar cuisine, rating, and/or costs), to which all the guests can reach by 1 PM can also be recommended. Typically, the user can select or confirm one or more of the solutions, which can be utilized to automatically or manually perform the task. In one aspect, the solutions can be provided and fine-tuned via a question and answer type communication with the user.

Figure 10:
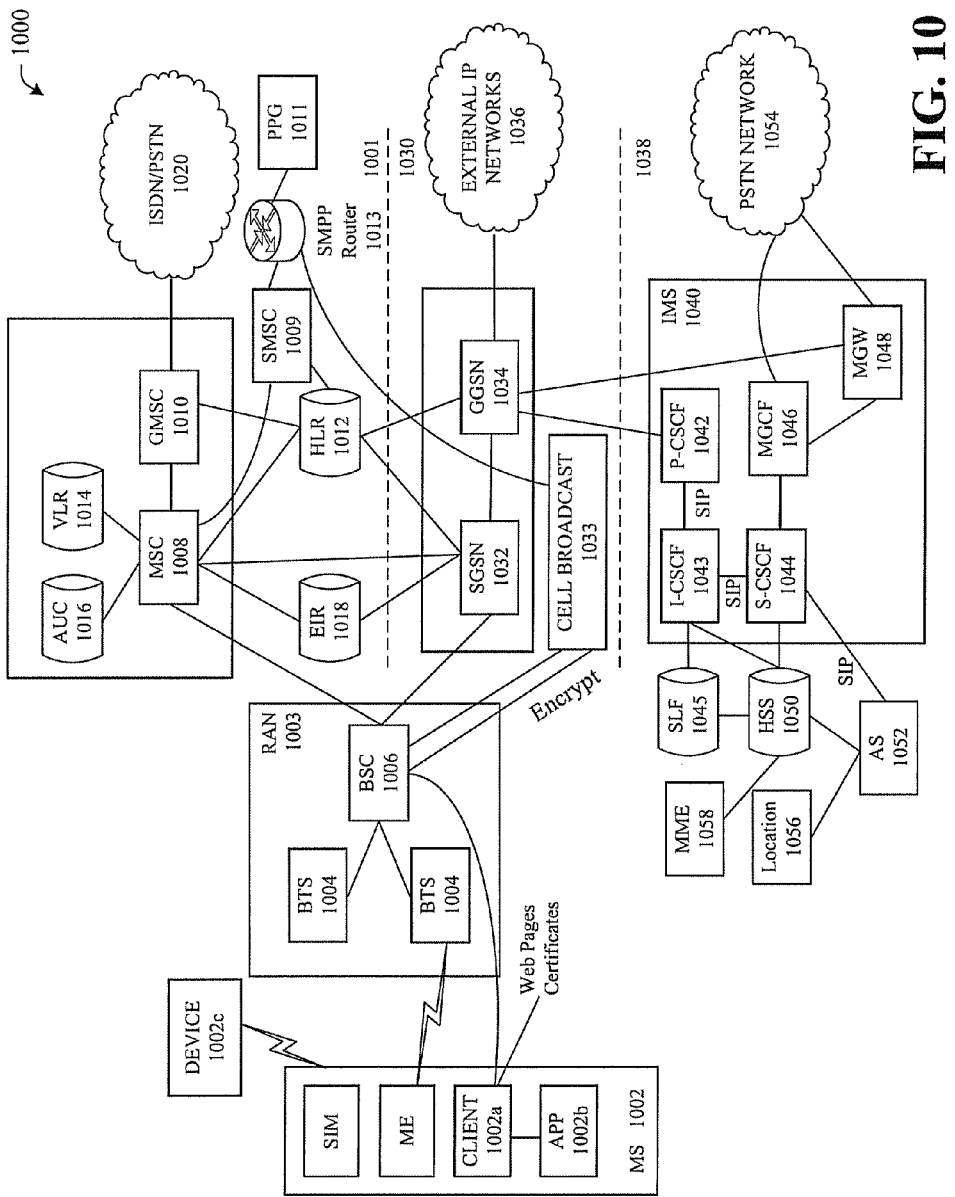
FIG. 10 illustrates a Global System for Mobile Communications (GSM)/General Packet Radio Service (GPRS)/Internet protocol (IP) multimedia network architecture that can employ the disclosed architecture.

Now turning to FIG. 10, such figure depicts an example GSM/GPRS/IP multimedia network architecture 1000 that can employ the disclosed communication architecture. In particular, the GSM/GPRS/IP multimedia network architecture 1000 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a can be implemented in JAVA and is discuss more fully below. It can be appreciated that MS 1002 can be substantially similar to UE 202 and include functionality described with respect to UE 202 in systems 200-500.

The embedded client 1002a communicates with an application 1002b (e.g., application(s) 202) that provides services and/or information to an end user. Additionally or alternately, the MS 1002 and a device 1002c can be enabled to communicate via a short-range wireless communication link, such as BLUETOOTH®. As one of ordinary skill in the art would recognize, there can be an endless number of devices 1002c that use the SIM within the MS 1002 to provide services, information, data, audio, video, etc. to end users.

The BTS 1004 is physical equipment, such as a radio tower, that enables a radio interface to communicate with the MS 1002. Each BTS can serve more than one MS. The BSC 1006 manages radio resources, including the BTS. The BSC 1006 can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. In one aspect, the BEX system 102 can obtain user related data from the HLR 1012 and/or the VLR 1014. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages. Typically, the monitoring component 104 can track SMS messages sent to and/or from the MS 1002.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events OCCUR.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations, security functions, and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS 1002 through the SGSN 1032. When packet-switched data leaves the GPRS network, it is transferred to an external TCP-IP network 1036, such as an X.25 network or the Internet. In order to access GPRS services, the MS 1002 first attaches itself to the GPRS network by performing an attach procedure. The MS 1002 then activates a packet data protocol (PDP) context, thus activating a packet communication session between the MS 1002, the SGSN 1032, and the GGSN 1034. In a GSM/GPRS network, GPRS services and GSM services can be used in parallel. A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038. The BEX system 102 can also collect user related data from the HSS 1050 to facilitate analysis (via the analysis component 106).

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002. The MME 1058 provides authentication of a user by interacting with the HSS 1050 in LTE networks.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with a PSTN network 1054 for TDM trunks. In addition, the MGCF 1046 communicates with the PSTN network 1054 for SS7 links. According to an embodiment, the BEX system 102 can be implemented within and/or communicatively coupled to the GSM network 1001, the GPRS network 1030, the IP multimedia network 1038, and/or the IP networks 1036.

Figure 11:
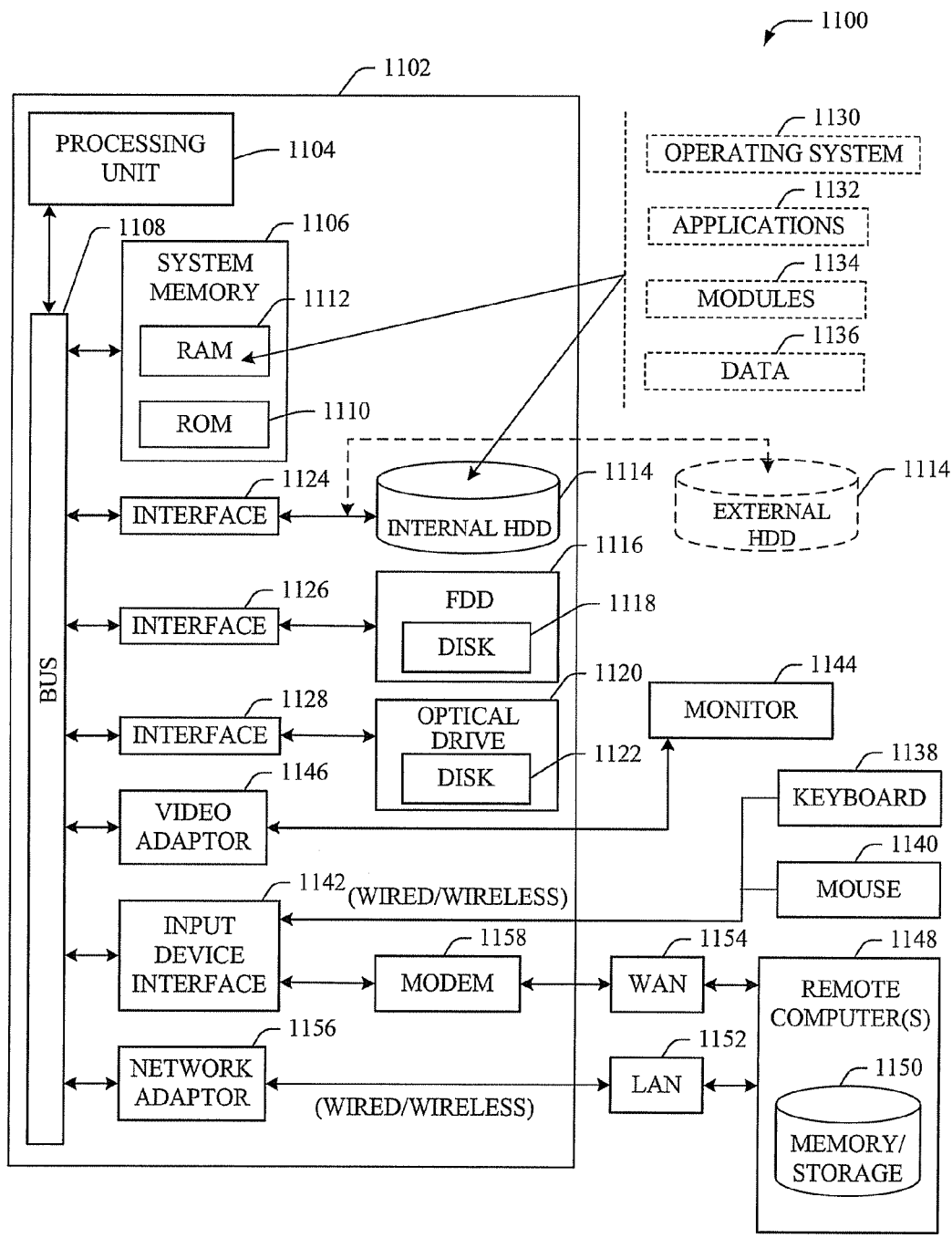
FIG. 11 illustrates a block diagram of a computer operable to execute the disclosed communication architecture.

Referring now to FIG. 11, there is illustrated a block diagram of a computer operable to execute the disclosed communication architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
     based on an analysis of conversation data transmitted within an audio communication session between a first communication device of a network and a second communication device of the network, determining, during the audio communication session, goal data indicative of a goal associated with the first communication device and the second communication device;
     based on data received from a network data store coupled to the first communication device and the second communication device, determining solution data indicative of solutions to accomplish the goal; and
     in response to the determining the solution data and determining that first speech data associated with the conversation data is not being transmitted between the first communication device and the second communication device during the audio communication session, generating second speech data based on the solution data and adding a network device that is coupled to the first communication device and the second communication device via the network as an additional participant in the audio communication session, and simultaneously transmitting the second speech data from the network device to the first communication device and the second communication device, wherein, in addition to the conversation data transmitted between the first communication device and the second communication device during the audio communication session, the second speech data is transmitted to the first communication device and the second communication device during the audio communication session, and third speech data is transmitted between the first communication device and the second communication device after receiving the second speech data associated with the solution data.

2. The system of claim 1, wherein the operations further comprise:
performing an action to implement a group of the solutions.

3. The system of claim 2, wherein the performing comprises performing the action in response to reception of authorization data from the first communication device and the second communication device.

4. The system of claim 1, wherein the audio communication session is a voice call between the first communication device and the second communication device, and wherein the transmission facilitates a presentation of the second speech data in a voice message played during the voice call between the first communication device and the second communication device.

5. The system of claim 1, wherein the solution data is determined in response to determining that the conversation data indicates that the goal is to be accomplished via a solution that is different from the solutions.

6. The system of claim 1, wherein the solution data is determined based on location data representing a geographical location of the first communication device.

7. The system of claim 1, wherein the conversation data comprises the first speech data and the operations further comprise:
converting the first speech data to textual data to facilitate the analysis.

8. The system of claim 7, wherein the operations further comprise:
evaluating the textual data based on a natural language processing technique to facilitate the determining the goal data.

9. The system of claim 1, wherein the determining the solution data comprises determining the solution data based on application data associated with an application to which the first communication device is subscribed.

10. The system of claim 1, wherein the transmission is a first transmission and the operations further comprise:
determining conflict data indicative of a conflict of the goal with an action associated with the first communication device, wherein the action is determined based on the analysis, and wherein the adding comprises adding the network device as the additional participant to facilitate a second transmission of the conflict data from the network device to the first communication device.

11. A method, comprising:
based on analyzing first conversation data transmitted during a communication session between a first communication device and a second communication device, determining, by a system comprising a processor, goal data indicative of a goal associated with the first communication device and the second communication device;

based on data received from a network data store that is coupled to the first communication device and the second communication device via a communication network, determining, by the system, action data indicative of an action that is to be performed for accomplishing the goal; and in response to the determining the action data and determining that the first conversation data is not being transferred between the first communication device and the second communication device during the communication session, generating second conversation data based on the action data, adding a network device that is coupled to the first communication device and the second communication device via the communication network as an additional participant in the communication session, transferring the second conversation data from the network device to the first communication device and the second communication device, simultaneously presenting, in addition to the first conversation data transmitted between the first communication device and the second communication device during the communication session, the second conversation data to the first communication device and the second communication device during the communication session, and facilitating transmission of third conversation data between the first communication device and the second communication device after the presenting the second conversation data associated with the action data.

12. The method of claim 11, further comprising:
performing, by the system, the action in response to receiving authorization data from the first communication device and the second communication device.

13. The method of claim 11, wherein the action is a first action, the action data is first action data and the method further comprises:
based on the analyzing the first conversation data, determining, by the system, second action data indicative of a second action that is to be performed to accomplish the goal; and
in response to determining that the first action is more efficient in accomplishing the goal than the second action according to a defined criterion, facilitating a display of recommendation data via the first communication device and the second communication device, wherein the recommendation data indicates that the first action is more efficient in accomplishing the goal than the second action according to the defined criterion.

14. The method of claim 11, wherein the determining the action data comprises determining the action data based on preference data relating to the first communication device and the second communication device.

15. The method of claim 11, wherein the determining the action data comprises determining the action data based on service data associated with respective services subscribed by the first communication device and the second communication device.

16. The method of claim 11, wherein the determining the action data comprises determining the action data based on location data representing a location of the first communication device.

17. The method of claim 11, further comprising:
receiving, by the system, the third conversation data from the first communication device and the second communication device; and based on the third conversation data, updating, by the system, the goal data and the action data.

18. A machine readable storage medium, comprising executable instructions that, when executed by a processor, facilitate performance of operations comprising:
- based on an analysis of conversation data exchanged between a first user equipment and a second user equipment during a communication session via a communication network, determining, during the communication session, goal data indicative of a goal associated with the first user equipment and the second user equipment;
- based on data received from a network data store of the communication network, determining task data indicative of a task that is to be performed, to accomplish the goal;
- verifying that first speech data associated with the conversation data is not being transmitted between the first user equipment and the second user equipment during the communication session; and
- subsequent to the determining the task data and the verifying, generating second speech data that comprises the task data, adding a network device of the communication network as an additional participant in the communication session, transferring, in parallel to the conversation data exchanged between the first user equipment and the second user equipment during the communication session, the second speech data from the network device to the first user equipment and the second user equipment during the communication session, and facilitating transfer of third speech data between the first communication device and the second communication device subsequent to the transferring the second speech data associated with the task data.

19. The machine readable storage medium of claim 18, wherein the communication session is a voice call and the transfer of the task data facilitates a playback of a voice message that comprises the second speech data during the voice call.

20. The machine readable storage medium of claim 18, wherein the transfer of the second speech data facilitates a display of a text message via the first user equipment and the second user equipment.

* * * * *